US008387019B1

(12) United States Patent
Ogami et al.

(10) Patent No.: US 8,387,019 B1
(45) Date of Patent: Feb. 26, 2013

(54) GRAPHICAL USER ASSIGNABLE REGISTER MAP

(75) Inventors: Kenneth Y. Ogami, Bothell, WA (US); Doug Anderson, Edmonds, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 1504 days.

(21) Appl. No.: 11/707,178

(22) Filed: Feb. 14, 2007

Related U.S. Application Data

(60) Provisional application No. 60/774,746, filed on Feb. 16, 2006.

(51) Int. Cl.
*G06F 9/44* (2006.01)
(52) U.S. Cl. ......... 717/125; 717/100; 717/113; 717/124
(58) Field of Classification Search .................. None
See application file for complete search history.

(56) References Cited

U.S. PATENT DOCUMENTS

| | | | | |
|---|---|---|---|---|
| 5,623,664 A | * | 4/1997 | Calvert et al. | 713/1 |
| 5,642,511 A | * | 6/1997 | Chow et al. | 717/105 |
| 5,956,688 A | * | 9/1999 | Kokubo et al. | 705/7.29 |
| 6,550,056 B1 | * | 4/2003 | Mizumoto et al. | 717/124 |
| 6,611,952 B1 | * | 8/2003 | Prakash et al. | 716/102 |
| 6,996,796 B2 | * | 2/2006 | Sanchez et al. | 716/117 |
| 7,210,137 B1 | * | 4/2007 | Tamma | 717/143 |
| 2003/0191924 A1 | * | 10/2003 | Weaver | 712/217 |
| 2005/0022170 A1 | * | 1/2005 | Brown et al. | 717/125 |
| 2005/0039169 A1 | * | 2/2005 | Hsu et al. | 717/124 |
| 2005/0138547 A1 | * | 6/2005 | Muhanna et al. | 715/513 |

OTHER PUBLICATIONS

CrossWorks Online Documentation Memory Map file format, © Copyright 2001, 2002, 2003, 2004 Rowley Associates Limited.*
Salas, "Visual Memory Maps for Mobile Robots," IEEE, 2000.*
Ferdinand et al., "Towards an Integration of Low-Level Timing Analysis and Model-Based Code Generation," IEEE, 2007.*
Getting Started with eCosTM Version 1.2.1, Copyright © 1998, 1999 by Cygnus Solutions.*
W4.0Linker and Utilities Manual, Revision 1.0, Jan. 2005, Analog devices.*
VisualDSP++ 3.5 Linker and Utilities Manual for 16-Bit Processors, Chapter 4: Expert Linker, Revision 1.0, Oct. 2003, Analog Devices.*

* cited by examiner

*Primary Examiner* — Insun Kang

(57) ABSTRACT

A design tool provides a graphical user assignable register map. The design tool graphically displays a register map that indicates locations of system variables in a memory of a processing device for an embedded application. The design tool further provides a user interface element for a user to arrange an order of the system variables in the register map.

17 Claims, 8 Drawing Sheets

GRAPHICAL USER ASSIGNABLE REGISTER MAP

CROSS-REFERENCE TO RELATED APPLICATIONS

This application claims the benefit of U.S. Provisional Application No. 60/774,746, filed Feb. 16, 2006, and incorporated herein by reference in its entirety.

TECHNICAL FIELD

Embodiments of the invention relate generally to embedded application development and more specifically, but not exclusively, to providing a graphical user interface (GUI) for a user to arrange the order of system variables in the memory.

BACKGROUND

Shortened time to design and user error reduction are essential to the success of application development environments. Current application development environments are geared towards system engineers. System engineers often need to monitor the values of important system variables when developing an embedded application. System variables may include, for example, input, output, and configurable variables defining the system behavior. The values of the system variables are generally stored in a memory and can be accessed by a user. Conventional application development techniques generally do not provide a clear visual map of system variable locations in the memory and generally do not offer efficient tools for the access of the system variables. In particular, when a user wishes to retrieve the system variables that are not located in contiguous memory locations, the user would typically have to calculate and provide a memory address for each of these system variables. Similarly, a user wishing to change or update the system variables in the application would have great difficulty in doing so. A user may need to hand code in assembly or C code in order to access the system variables. Such an approach may be too low level for system designers. Thus, conventional approach is inflexible, inefficient, and error prone.

BRIEF DESCRIPTION OF THE DRAWINGS

The present invention is illustrated by way of example and not limitation in the figures of the accompanying drawings, in which.

DETAILED DESCRIPTION

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

A graphical user assignable register map is described. In one embodiment, a register map graphical user interface (GUI) displays a register map that interacts with user inputs. Register map manager GUI provides a visual picture of system variables and enables the user to arrange the order of the system variables in the register map. Register map manager GUI also allows grouping of related variables in the register map. Thus, the graphical user assignable register map improves visibility and accessibility of the system variables.

Figure 1:
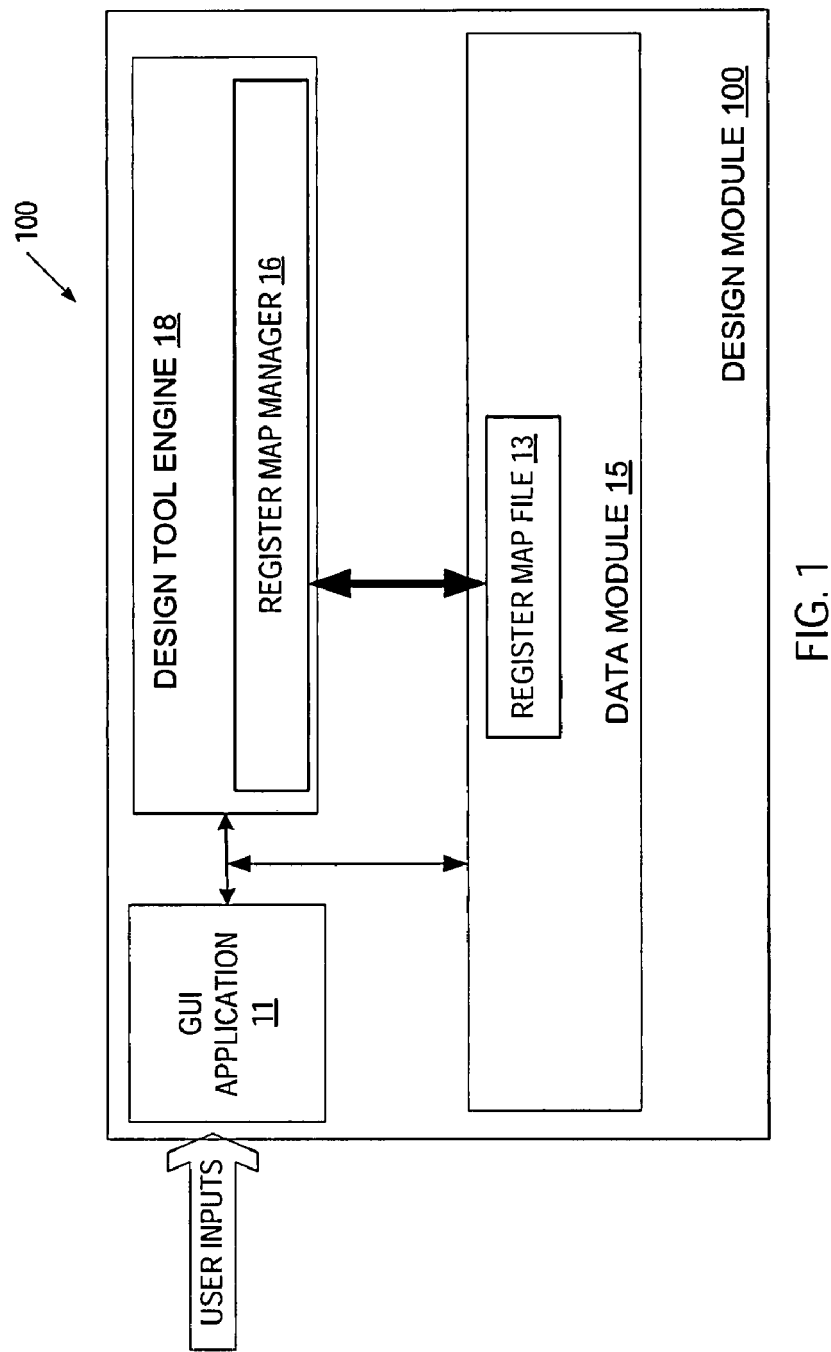
FIG. 1 is a block diagram of one embodiment of a design module that facilitates graphical user assignable register map.

FIG. 1 illustrates one embodiment of a design module 100 that provides a graphical user assignable register map for an embedded system design. The embedded system may be implemented on a processing device selected by a user. A processing device herein refers to a configurable chip that includes memory and functional blocks, which, when configured according to a system design, form an embedded system. A map that describes the locations of the system variables in the memory of the processing device is referred to as a register map.

In this embodiment, a GUI application 11 renders a register map GUI that interacts with a user in the arrangement of system variables in a register map. System variables herein refer to the input and output of an embedded system, as well as variables of transfer functions that define the behavior of the embedded system. The values of system variables may be monitored by system engineers through a communication interface in order to verify a system design.

Design module 100 may include a design tool engine 18 that configures the processing device into an embedded system according to the user's system-level specification. The design tool engine 18 includes a register map manager 16 that allocates one or more system variables to locations in the memory. Register map manager 16 maintains the allocation of system variables in a register map file 13 stored in data module 15. Register map file 13 may be in the form of an extensible markup language (XML) schema or other suitable formats.

GUI application 11 may render register map GUI at any point of a design process after a system design is formed. A user of design module 100 may form a system design by specifying system inputs and outputs, transfer functions, and, optionally, one or more communication interfaces. The communication interfaces allow the user to monitor and control the system status, which can be described by one or more of the system variables. Examples of the communication interface include Inter-Integrated (I2C) bus interface, Universal Serial Bus (USB) interface, wireless USB interface, as well as other standardized or configurable communication interfaces. The communication interface has access to a memory in the processing device that stores the current values of the system variables. The memory may be any memory device that allows dynamic updates of its contents, e.g., a random-access memory (RAM), a flash memory, or other volatile or non-volatile memory devices.

To access a system variable in the memory through the communication interface, a user generally provides a pointer to a memory location and a size of the system variable. The pointer for each system variable may be an absolute address or an offset from a pre-defined base address. To access multiple system variables that are not contiguously located in the memory, the user may need to provide a pointer and a size for each of these system variables. This process can be time-consuming and error prone. Using a register map manager GUI to be described below, a user may group the frequently-monitored system variables into a contiguous memory block to allow easy access.

An exemplary user interface (UI) will now be described with reference to FIG. 2. The exemplary UI may be generated in a variety of ways, such as using HyperText Markup Language (HTML), JavaScript, or the like. It will be understood that embodiments of the present invention are not limited to the UIs discussed herein.

Figure 2:
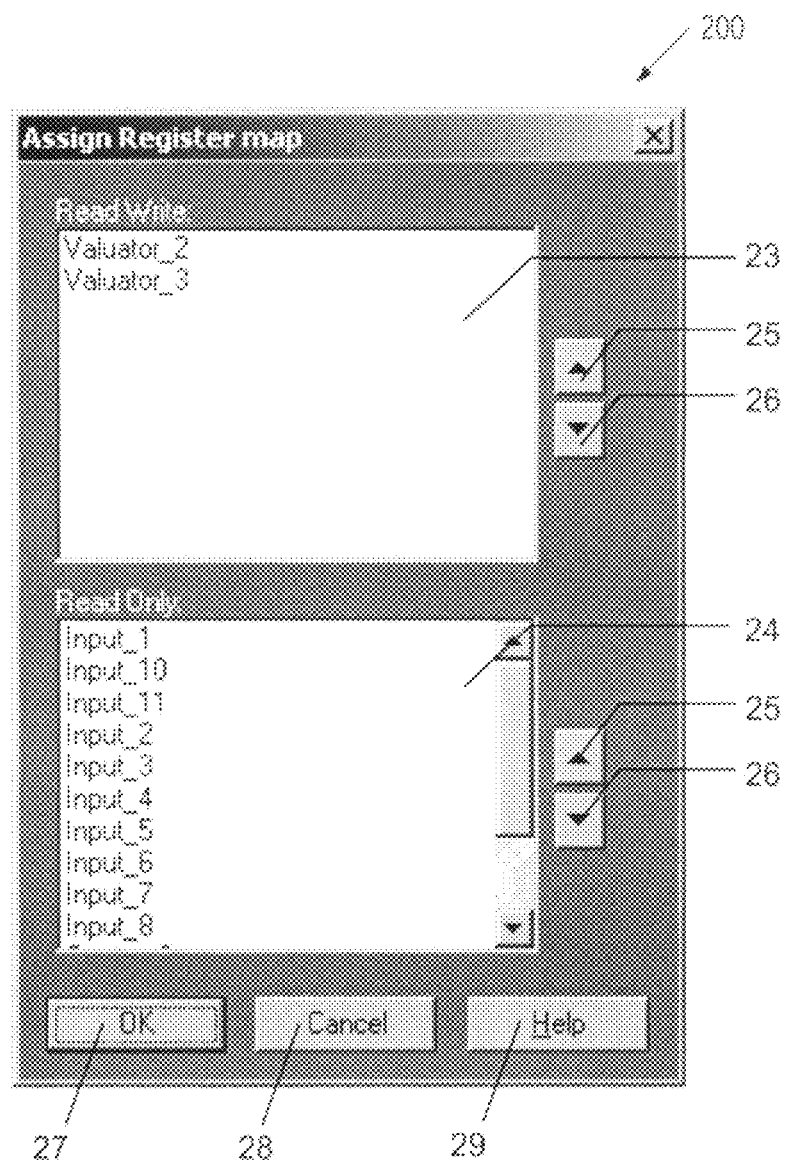
FIG. 2 illustrates an embodiment of a register map graphical user interface.

FIG. 2 illustrates one embodiment of a register map GUI 200. Register map GUI 200 provides a user the ability to arrange the order of system variables in the memory. Before the user manipulates the ordering of the system variables, register map manager GUI 200 may present the system variables according to a default ordering scheme, e.g., an alphabetical ordering scheme in which system variables are ordered alphabetically in the memory. Other default ordering schemes may also be used.

In one particular embodiment, a user may invoke register map manager GUI 200 by selecting the "Assign Register Map" from a tool bar menu under "Project" in a design window. Register map manager GUI 200 may be invoked before a build process, during which the user's system design is associated with a configurable processing device. A user may need to rebuild the design if system variables are re-ordered after the build process.

Register map manager GUI 200 may include an assign menu which is divided into a plurality of list boxes. Each list box displays the system variables that have the same read status and write status. In this embodiment, register map manager GUI 200 is shown to include a Read-Write list box 23 and a Read-Only list box 24. Read-Write list box 23 presents a list of read-write variables, the values of which are readable and writable. Read-Only list box 24 presents a list of read-only variables, the values of which are readable but not writable. The system variables in each list box 23, 24 can be re-ordered within the list box but not across the list box boundaries. For example, a read-write variable can be re-ordered within Read-Write list box 23, but cannot be moved into Read-Only list box 24.

The position of a system variable in register map manager GUI 200 indicates its location in the memory. Thus, according to register map manager GUI 200, all read-write variables precede read-only variables in the memory locations. In one embodiment, contiguous memory space is allocated to the displayed system variables according to the order in which they appear in register map manager GUI 200. Thus, the address or offset of a system variable can be easily calculated by adding the total size of all the preceding system variables to a base address.

A system variable may be moved within list box (23 or 24) by swapping positions with an immediate neighboring system variable. A user may swap positions of variables by selecting an indicator, e.g., a button, which indicates the direction of movement. In this embodiment, next to each list box 23, 25 is a pair of buttons, including a promote button 25 and a demote button 26. To change the ordering in list box (23 or 24), a user may select a system variable in the list box and press promote button 25 or demote button 26. The promote button 25 moves a system variable up and demote button moves a system variable down. Thus, the selected system variable will appear above or below its previous position according to the button pressed. For example, if Input_2 is selected and promote button 25 is pressed, Input_2 will move up one position. As a result, the positions of Input_11 and Input_2 will be swapped. If Input_2 is selected and demote button 26 is pressed, Input_2 will move down one position. As a result, the positions of Input_2 and Input_3 will be swapped. The user may repeatedly re-order the system variables in list boxes 23 and 24 until a desired ordering is achieved.

Additionally, register map manager GUI 200 may include an OK button 27 to accept the current register map, a Cancel button 28 to cancel the current operations, and a Help button 29 to obtain explanations for the GUI operations. Other selectors or indicators may also be provided.

Figure 3:
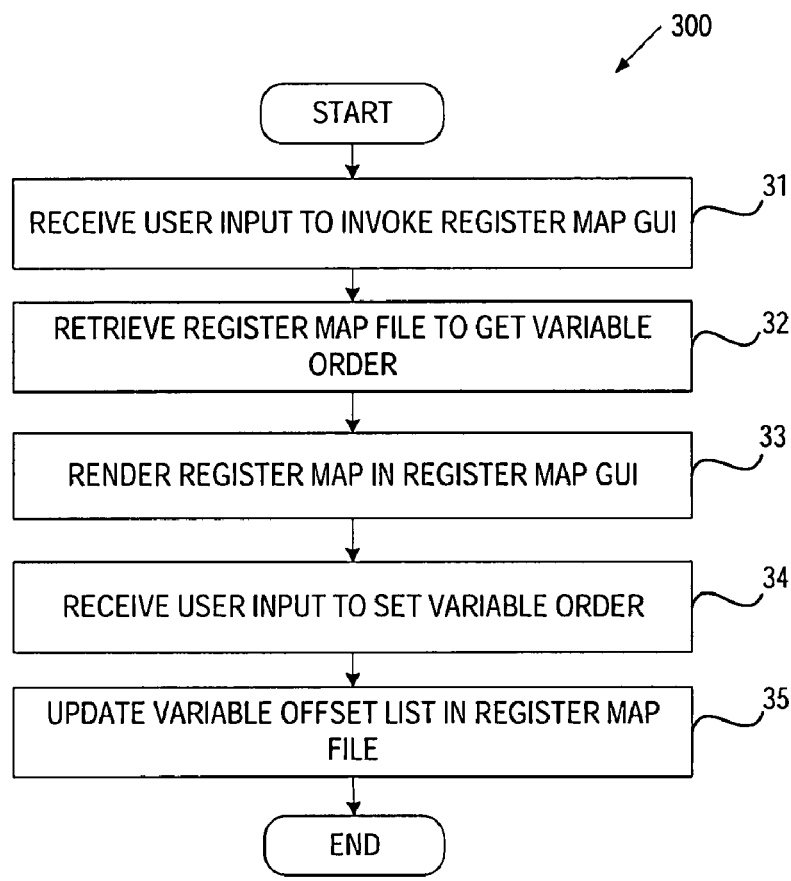
FIG. 3 is a flow diagram of one embodiment of a method that facilitates the graphical user assignable register map.

FIG. 3 is a flowchart that illustrates an embodiment of a method 300 performed by processing logic of design module 100 of FIG. 1. Method 300 may be performed by processing logic of the application design module 100. Processing logic may comprise hardware (e.g., circuitry, dedicated logic, programmable logic, microcode, etc.), software (such as run on a general purpose computer system or a dedicated machine), or a combination of both.

At block 31, design module 100 receives a user input to invoke register map GUI (e.g., register map manager GUI 200 of FIG. 2). The user input is communicated to register map manager 16 in the form of a design tool engine (DTE) call Get_Variable_Register_Order. The DTE call invokes register map manager 16 to obtain the ordering of system variables in the memory. The ordering may be stored in register map file 13 of FIG. 1. At block 32, register map manager 16 retrieves register map file 13 from the data module 15 according to the user input. After register map manager 16 retrieves the schema, at block 33, the information in the schema is passed onto GUI application 11, which renders a register map in register map manager GUI 200. The user may arrange the order of the system variables by selecting a system variable and pressing the promote button 25 or the demote button 26. At block 34, the arrangement made by the user is sent to register map manager 16 in the form of a DTE call Set_Variable_Register_Order. The DTE call sets the order of system variables in the memory. At block 35, register map manager 16 updates a DTE_VARIABLE_OFFSET_LIST in register map file 13 to update the information of those system variables affected by the user arrangement. The DTE_VARIABLE_OFFSET_LIST may be used by design module 100 in the build process to implement the system design into the targeted processing device.

An example of the XML schema stored in register map file 13 may be as follows:
<DTE_DB>
<DTE_VARIABLE_OFFSET_LIST>
<DTE_VARIABLE_OFFSET
  VARIABLE_NAME="writer" VARIABLE_OFFSET="0" VARIABLE_SIZE="1"
  VARIABLE_ACCESS="RW" ORDINAL="0"/>

```
<DTE_VARIABLE_OFFSET
    VARIABLE_NAME="Input_1" VARIABLE_OFFSET="1" VARIABLE_SIZE="1"
    VARIABLE_ACCESS="RO" ORDINAL="1"/>
<DTE_VARIABLE_OFFSET
    VARIABLE_NAME="Valuator_1" VARIABLE_OFFSET="2" VARIABLE_SIZE="1"
    VARIABLE_ACCESS="RO" ORDINAL="2"/>
<DTE_VARIABLE_OFFSET
    VARIABLE_NAME="bounce_state" VARIABLE_OFFSET="3" VARIABLE_SIZE="1"
    VARIABLE_ACCESS="RO" ORDINAL="3"/>
<DTE_VARIABLE_OFFSET
    VARIABLE_NAME="bounce_transition" VARIABLE_OFFSET="4" VARIABLE_SIZE="1"
    VARIABLE_ACCESS="RO" ORDINAL="4"/>
<DTE_VARIABLE_OFFSET
    VARIABLE_NAME="switchbank_packed_val"
    VARIABLE_OFFSET="5" VARIABLE_SIZE="1"
    VARIABLE_ACCESS="RO" ORDINAL="5"/>
</DTE_VARIABLE_OFFSET_LIST>
</DTE_DB>
```

In the above schema, VARIABLE_NAME represents the name of a system variable, which may be a default name or a name assigned by the user. VARIABLE_OFFSET indicates the location of the system variable in the memory. The offset may represent a distance to a base address, which may be measured in bytes or any other standard units. VARIABLE_SIZE indicates the size of the system variable, which may be bytes or other standard units. VARIABLE_ACCESS indicates the read-and-write status of the system variable, e.g., "RW" means readable and writable, and "RO" means read-only. ORDINAL indicates the order of the system variable in the register map and in the corresponding memory.

The graphical user assignable register map described herein enables a target user (e.g., a system designer) to view and arrange the register map. The graphical user assignable register map provides an appropriate level of interface for system designers and excellent visibility of the whole registry map. It also offers a flexible and easy-to-use GUI for a user to change and update the order of system variables in the register map.

In one embodiment, the graphical user assignable register map described herein may be used in a design tool for embedded applications, e.g., PSoC Express™, available from Cypress Semiconductor, Inc., with headquarters in San Jose, Calif. Alternatively, the graphical user assignable register map may be used in other design tools.

Figure 4:
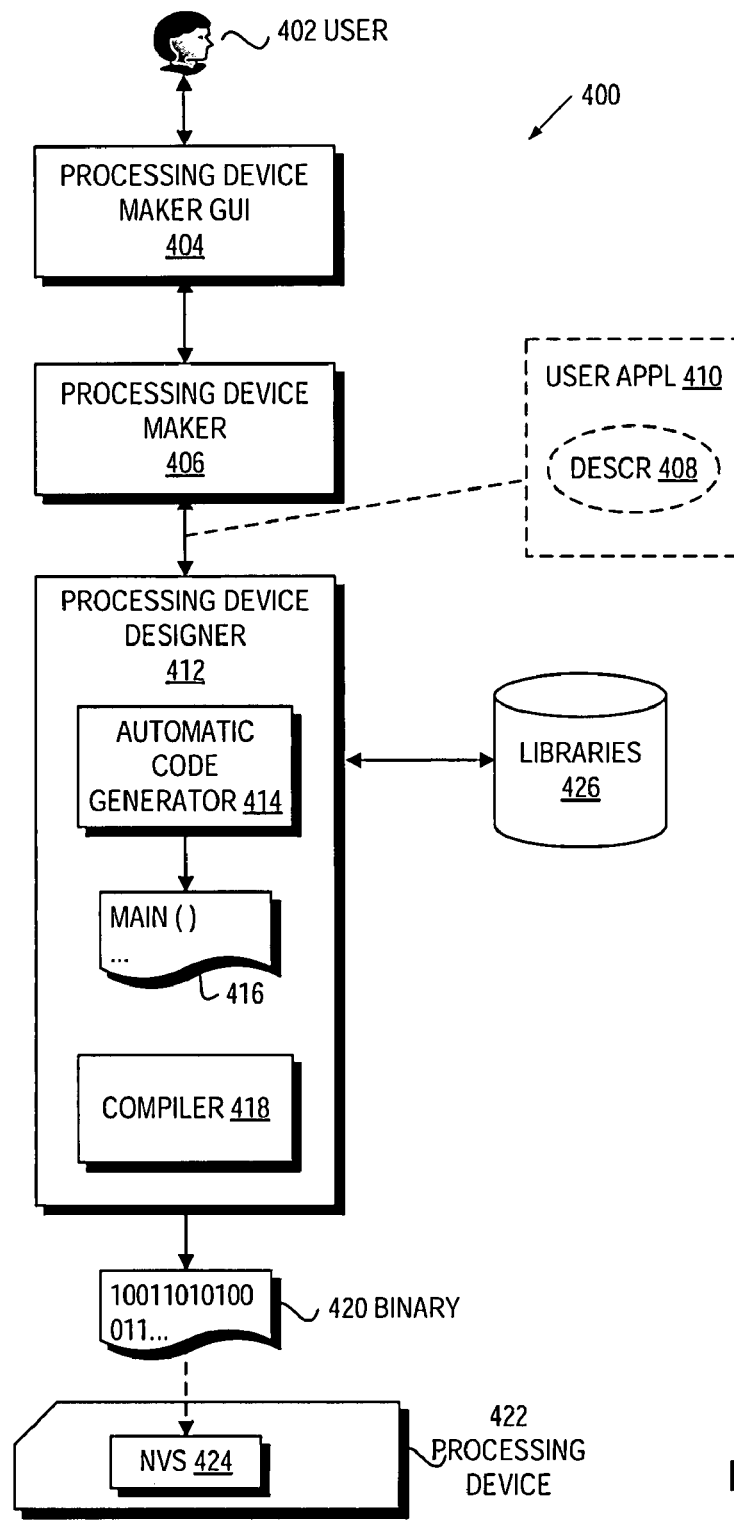
FIG. 4 is a block diagram of one embodiment of a system enabling automated code generation of processing device firmware.

FIG. 4 illustrates an exemplary system 400 in which embodiments of the present invention may operate. System 400 provides automated code generation of processing device firmware in accordance with one embodiment of the present invention.

System 400 includes a processing device maker GUI 404 that may be used by a user 402 to construct a user application 410 for implementation on a processing device 422. Processing device maker GUI 404 overlays a processing device maker 406. Register map manager GUI 200 of FIG. 2 may represent a pop-up window in processing devices maker GUI 404. In addition, design module 100 of FIG. 1 may be used as part of system 400 to generate processing device maker GUI 404 and facilitate its functionality during the design of user application 410.

User application 410 may be described in a user application description 408. In one embodiment, user application description 408 is a text file that describes user's application 410.

After user 402 completes the design of application 410, user 402 may perform a simulation of user application 410. The simulation capability enables hardware independence by verifying the transfer function behavior without requiring the user to compile and debug the firmware on the targeted processing device. Simulation also includes the ability to create complex input files to exhaustively test the transfer function behavior with arbitrarily large combinations of input values. The simulation logs the outputs based on the transfer function behavior so that the results may be analyzed by the user.

Next, user 402 may request via processing device maker GUI 404 that processing device code be automatically generated. User 402 does not have to perform any actual coding. In one embodiment, after user 402 selects the targeted processing device, user application description 408 is handed-off to a processing device designer 412 for the generation of processing device code. Processing device designer 412 may include an automatic code generator 414 that assembles the code for user's application 410 based on user application description 408. Automatic code generator 414 generates processing device code 416 (e.g., high-level language code, such as C, low-level code, such as Assembly, or a combination thereof).

In one embodiment, automatic code generator 414 references libraries 426 that include code blocks that may be combined to form code 416. Automatic code generator 416 may use at least a portion of user application description 408 as a guide in gathering together various code blocks. Some of the code blocks may be selected based at least in part on targeted processing device 422.

A compiler 418 compiles code 416 to generate a binary 420, also known as a binary image or a Read-Only Memory (ROM) image. Binary 420 is loaded into a Non-Volatile Storage (NVS) 424 of processing device 422. In one embodiment, NVS 424 includes Flash memory.

Embodiments of processing device 422 may include one or more general-purpose processing devices, such as a microprocessor or central processing unit, a network processor, a microcontroller, an embedded Programmable Logic Device (PLD), or the like. Alternatively, the processing device may include one or more special-purpose processing devices, such as a Digital Signal Processor (DSP), an Application Specific Integrated Circuit (ASIC), a Field Programmable Gate Array (FPGA), or the like. The processing device may also include any combination of a general-purpose processing device and a special-purpose processing device.

It will be appreciated that because code 416 is constructed from pre-built and pre-tested code libraries, time wasted on debugging, such as finding syntax errors, is eliminated. It will also be appreciated that user 402 has generated user application 410 without referencing a targeted processing device. Instead of choosing a processing device to implement a user application and then writing code for that processing device, embodiments of the present invention allow a user application to be created and then code automatically generated for a particular processing device. Moreover, a user may take a user application, make revisions to the user application, and quickly generate revised programming device code.

Figure 5:
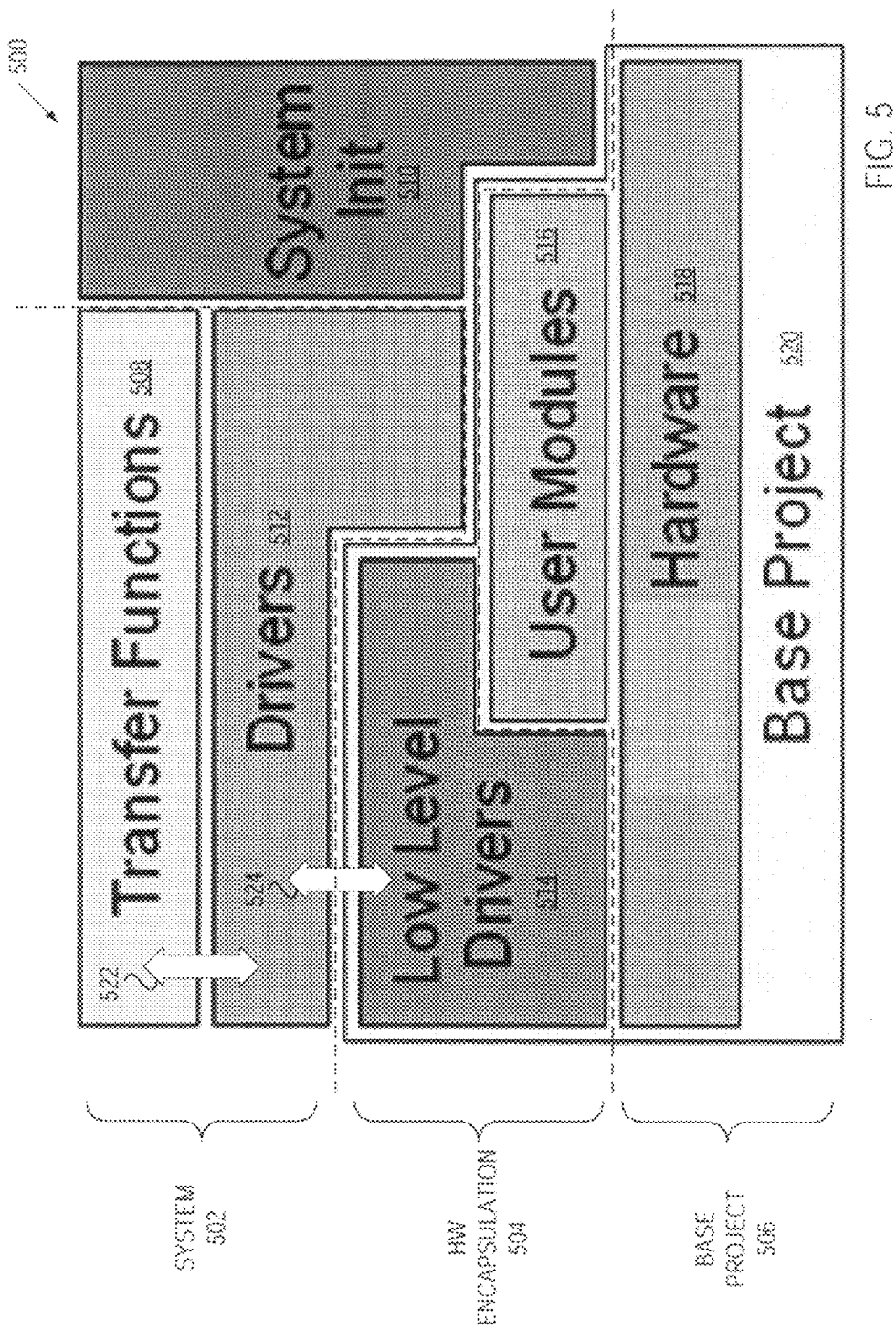
FIG. 5 illustrates a firmware stack in accordance with one embodiment of the present invention.

Referring to FIG. 5, a firmware stack 500 in accordance with one embodiment of the invention is shown. Firmware stack 500 shows a logical structure of at least a portion of processing device code 416. Data module 15 of FIG. 1 may include at least a portion of firmware stack 500. As discussed below, a portion of the stack is abstracted away from specific hardware. Such hardware independency provides the automatic code generator a consistent architecture for stitching together various code blocks.

Firmware stack 500 includes a system layer 502, a hardware encapsulation layer 504, and a base project layer 506. As will be described further below, the functionality of system layer 502 is independent of the targeted processing device. Also, interfaces, such as Application Program Interfaces (APIs), made between system layer 502 and the remaining layers of firmware stack 500 are standardized regardless of the targeted processing device. The term "standardized" refers to the hardware independence of the APIs. This abstraction away from specific hardware allows system layer 502 to function without regard to the particular hardware. The low layers of firmware stack 500 have "knowledge" of the specific hardware and take care of the implementation details for system layer 502.

Hardware encapsulation layer 504 and base project layer 506 are generated based at least in part on the targeted processing device. Hardware encapsulation layer 504 represents the underlying hardware to system layer 502. Base project layer 506 includes a set of standard functions associated with the targeted processing device hardware. Base project layer 506 may include functionality at the register level of the targeted processing device.

System layer 502 may include transfer functions 508 and drivers 512. System layer 502 is targeted by an application level mapping function. Transfer functions 508 invoke the transfer functions defined by the user 402.

Drivers 512 are usually associated with a hardware component of the processing device. In one embodiment, drives 512 may include three types: input, output, or interface. An output driver may be used with a device that is controlled by the user application, such as a fan or heater. Input drivers may be used for sensors, such as temperature or voltage sensors. Interface drivers may be used for devices that allow access to system variables and status, such as an Inter-Integrated Circuit (I2C) or a Serial Peripheral Interface (SPI).

Transfer functions 508 and drivers 512 may communicate with each other using APIs 522. Embodiments of an API include DriverName-Instantiate to initialize a device, DriverName_GetValue to return a value from an input device, and DriverName_SetValue to set an output of an output device to a specific value. Such APIs are defined such that the may be invoked regardless of the particular hardware.

Drivers 512 communicate with hardware encapsulation layer 504 using channels 524. Channels 524 are hardware independent. A channel may be further defined by a channel type, such as an input voltage channel, an output voltage channel, or the like. In one embodiment, channels 524 are implemented as APIs.

Hardware encapsulation layer 504 may include low level drivers 514 and system initialization 510. Low level drivers 514 provide the implementation of channels 524. In one embodiment, all drivers 512 use one or more channels 524 to communicate with low level drivers 514. In one embodiment, a channel may have associated parameters assigned by a low level driver, and the associated driver must conform to those parameters.

In one embodiment, base project layer 506 includes User Modules (UMs) 516 and processing device hardware 518. User modules 516 are used with block arrays in processing device hardware 518 to form hardware components, such as an Analog-Digital Converter (ADC).

FIG. 5 also shows low level drivers 514, user modules 516, and Hardware 518 grouped into a Base Project 520.

Figure 6:
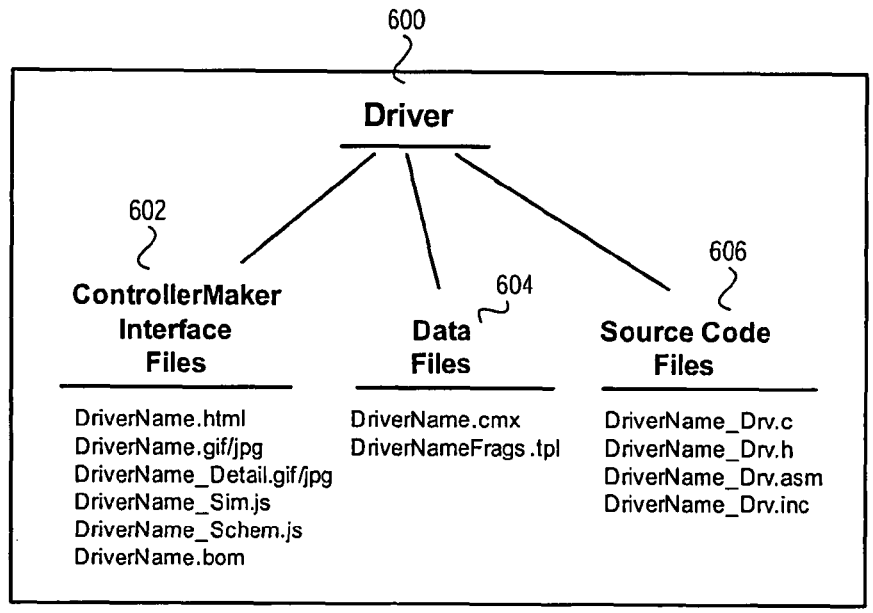
FIG. 6 illustrates a driver in accordance with one embodiment of the present invention.

Turning to FIG. 6, an embodiment of driver 600 is shown. In one embodiment, driver 600 includes several components for device selection and code generation. These components may be grouped into ControllerMaker Interface files 602, Data files 604, and Source Code files 606. Interface files 602 may include files to generate the visual interface in processing device maker GUI 404. Data files 604 may include a driver name file that includes information about channel type, resource requirements, association with image files, and user selectable parameters. In one particular embodiment, the driver name file may be a DriverName.cmx file. The .cmx file extension indicates that the file can be used by a CMX engine, which is a proprietary design tool engine from Cypress Semiconductor, Inc. It is understood that other design tool engines and file formats may also be used. Source code files 606 include the driver firmware. Driver 600 may be written in C, Assembly, or a combination thereof.

Figure 7:
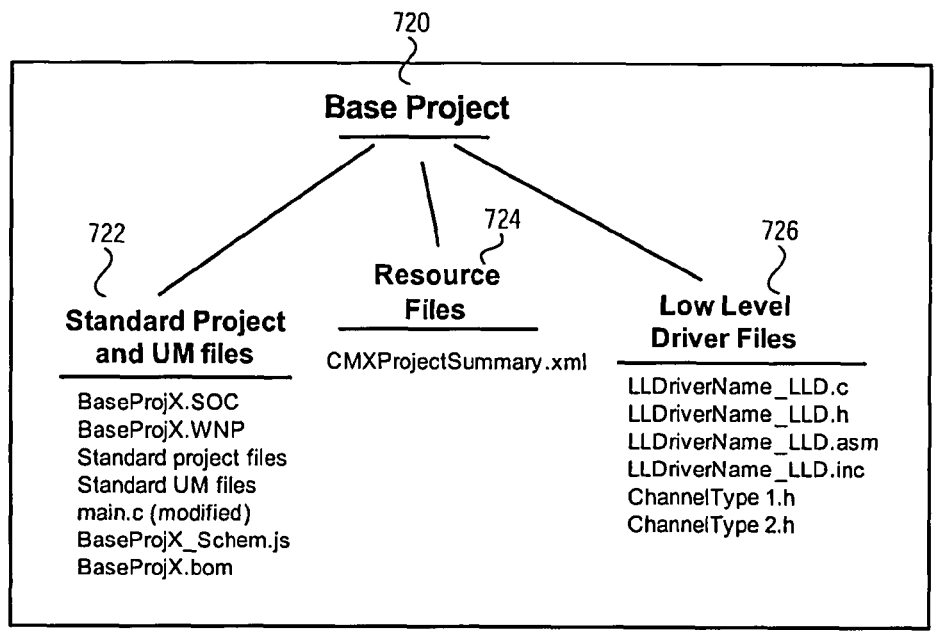
FIG. 7 illustrates a base project in accordance with one embodiment of the present invention.

Turning to FIG. 7, an embodiment of a base project 720 is shown. In one embodiment, base project 720 is built around the targeted processing device. Automatic code generator 414 refers to user application description 408 and adds the appropriate code for the drivers and transfer functions. The standardized calls to and from the drivers provide a consistent architecture for reliably connecting base project 720 to drivers.

Base project 720 may include any system design project using any of the processing device family of parts that support one or more driver channel types. In one embodiment, if a base project supports a given channel type, it must support it fully. The channel may support an external interface to the input or output signal as well as low level firmware to support the signal acquisition and signal conditioning required for reliable signal measurement. Processing device designer 412 adds drivers, such as driver 600, to a base project to support the input/output devices selected by user 402 in user application 410. A project summary file is included in a base project to define what channel types are supported and how many channels are available.

Base project 720 may include standard project and UM files 722, resource files 724, and low level driver files 726. Standard project and UM files 722 may include files that describe the specific user modules employed in the design project and their specific placement. The UM's and their placement determine the mapping of the channels to the external pins. With the UM configuration file, specific UM API files are included in so much as they are needed to control specific interrupt behavior required for successful signal acquisition and conditioning. By themselves these files create an empty project.

Low level driver files 726 provide the implementation of the channels supported by a given base project. A variety of ways can be used to implement a given channel type. For example, a volts channel can be supported by a wide range of ADCs, multiplexers, and ADC resolutions, as long as the API for the specific channel is fully supported. Some base projects may offer more resolution than others for certain channel types. These differences may be specified in a project summary file, e.g., a CMXProjectSummary.xml file. The CMX file prefix indicates that the file can be used by a CMX engine, which is one embodiment of design tool engine 18 of FIG. 1. It is understood that other design tool engines and file formats may also be used.

Resource files may include the project summary file, which may be an eXtensible Markup Language (XML) file contains metadata that communicate a list of resources provided by the base project to design tool engine 18. The XML file indicates the types and count of each of the resource channels and interfaces supported. It also determines the channel assignment order and prioritization, in the case of channels competing for similar resources. It may also provide specifications of each of the channel types, where applicable.

Figure 8:
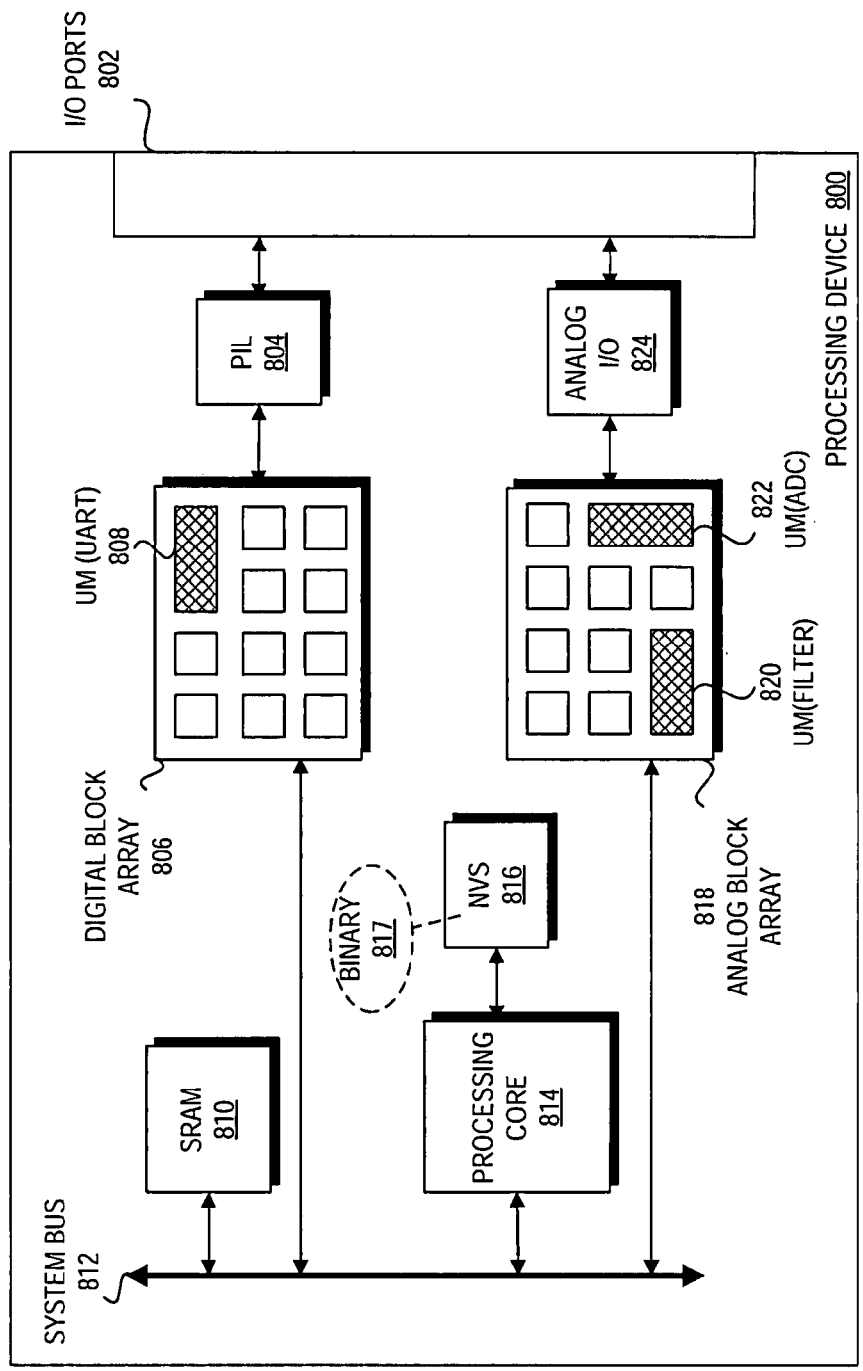
FIG. 8 is a block diagram of one embodiment of a processing device.

Turning to FIG. 8, an embodiment of a processing device 800 is shown. Processing device 800 includes a microcontroller. Processing device 800 includes Input/Output (I/O) ports 802. In one embodiment, I/O ports 802 are programmable. I/O ports 802 are coupled to a Programmable Interconnect and Logic (PIL) 804 which is coupled to a digital block array 806. In FIG. 8, digital block array 806 includes a UM 808 that has been configured as a Universal Asynchronous Receive/Transmitter (UART). Digital block array 806 is coupled to a system bus 812.

A Static Random Access Memory (SRAM) 810 and a processing core 814 are also coupled to system bus 812. Processing core 814 is coupled to NVS 816 which has stored a binary 817. In one embodiment, binary 817 includes instructions generated as described herein. In another embodiment, binary 817 may include instructions executable by processing core 814 as well as instructions for configuring block arrays 816 and 818.

Analog block array 818 is coupled to system bus 812. In the embodiment of FIG. 8, analog block array 818 includes a UM 820 configured as a filter and a UM 822 configured as an ADC. Analog block array 818 is also coupled to an analog I/O unit 824 which is coupled to I/O ports 802. Processing device 800 may also include other components, not shown for clarity, including a clock generator, an interrupt controller, an I2C, or the like.

Figure 9:
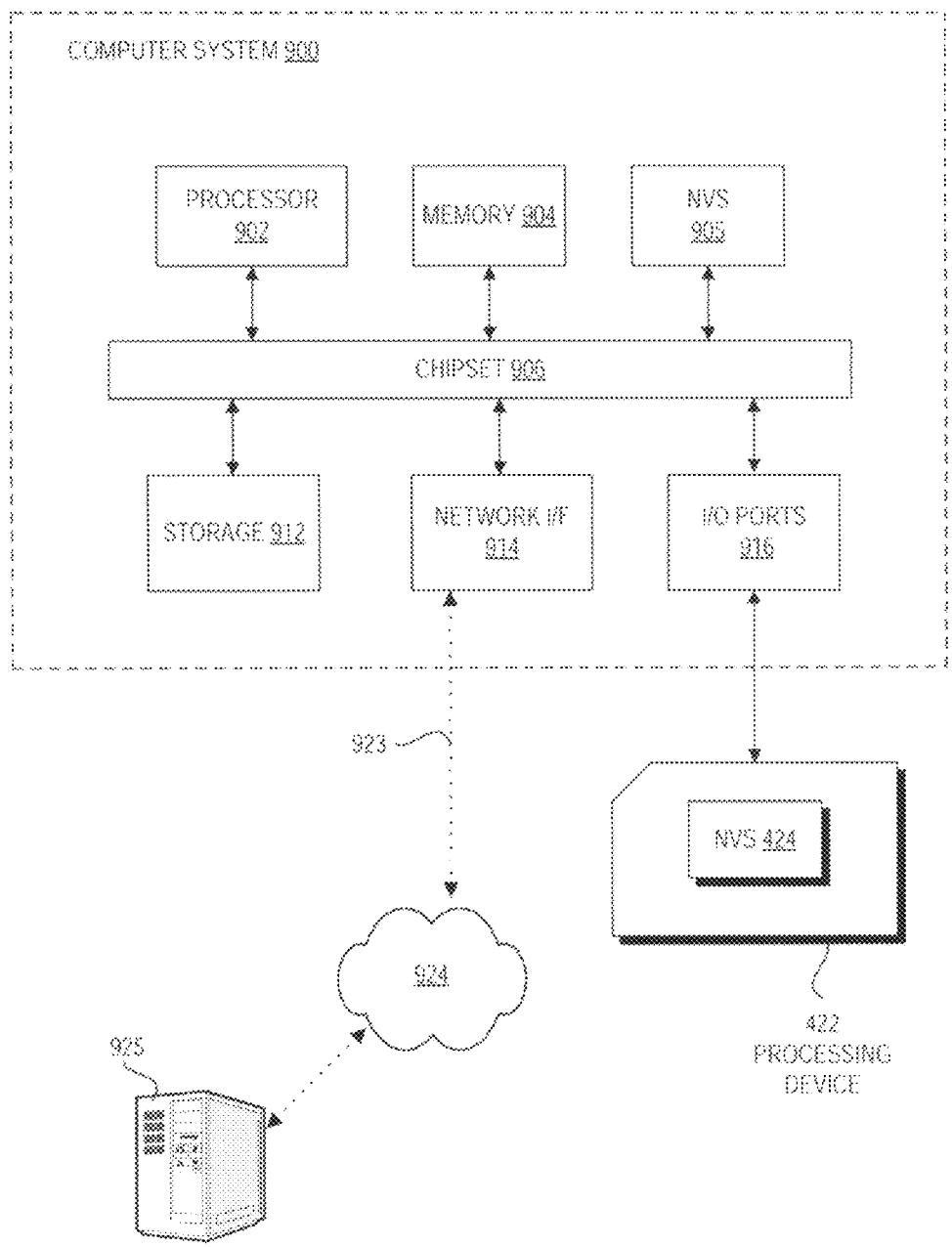
FIG. 9 is a block diagram of one embodiment of a computer system.

FIG. 9 illustrates an exemplary computer system 900 on which embodiments of the present invention may be implemented. Computer system 900 includes a processor 902 and a memory 904 coupled to a chipset 906. Storage 912, Non-Volatile Storage (NVS) 905, network interface (I/F) 914, and Input/Output (I/O) ports 918 may also be coupled to chipset 906. Embodiments of computer system 900 include, but are not limited to, a desktop computer, a notebook computer, a server, a personal digital assistant, a network workstation, or the like. In one embodiment, processor 902 executes instructions stored in memory 904.

Memory 904 may include, but is not limited to, Dynamic Random Access Memory (DRAM), Static Random Access Memory (SRAM), Synchronized Dynamic Random Access Memory (SDRAM), or the like.

Chipset 906 may include a memory controller and an input/output controller. Chipset 906 may also include system clock support, power management support, audio support, graphics support, or the like. In one embodiment, chipset 906 is coupled to a board that includes sockets for processor 902 and memory 904.

Components of computer system 900 may be connected by various interconnects. Such interconnects may include a Peripheral Component Interconnect (PCI), a System Management bus (SMBUS), a Low Pin Count (LPC) bus, a Serial Peripheral Interface (SPI) bus, an Accelerated Graphics Port (AGP) interface, or the like.

I/O ports 916 may include ports for a keyboard, a mouse, a display, a printer, a scanner, or the like. Embodiments of I/O ports 916 include a Universal Serial Bus port, a Firewire port, a Video Graphics Array (VGA) port, a Personal System/2 (PS/2) port, or the like.

Processing device 422 may be coupled to computer system 900 via I/O ports 916. Computer system 900 may have stored computer-readable instructions, in accordance with embodiments described herein, to allow a user to design application 410 using UIs described herein and automatically generate processing device code for processing device 422 using computer system 900. This code may be compiled into a binary and loaded into NVS 424.

Computer system 900 may interface to external systems through network interface 914. Network interface 914 may include, but is not limited to, a modem, a Network Interface Card (NIC), or other interfaces for coupling a computer system to other computer systems. A carrier wave signal 923 may be received and transmitted by network interface 914. In the embodiment illustrated in FIG. 9, carrier wave signal 923 is used to interface computer system 900 with a network 924, such as a Local Area Network (LAN), a Wide Area Network (WAN), the Internet, or any combination thereof. In one embodiment, network 924 is further coupled to a computer system 925 such that computer system 900 and computer system 925 may communicate over network 924.

Computer system 900 also includes non-volatile storage 905 on which firmware and/or data may be stored. Non-volatile storage devices include, but are not limited to, Read-Only Memory (ROM), Flash memory, Erasable Programmable Read Only Memory (EPROM), Electronically Erasable Programmable Read Only Memory (EEPROM), Non-Volatile Random Access Memory (NVRAM), or the like. Storage 912 includes, but is not limited to, a magnetic disk drive, a magnetic tape drive, an optical disk drive, or the like. It is appreciated that instructions executable by processor 902 may reside in storage 912, memory 904, non-volatile storage 905, or may be transmitted or received via network interface 914.

For the purposes of the specification, a machine-readable medium includes any mechanism that provides (i.e., stores and/or transmits) information in a form readable or accessible by a machine (e.g., a computer, network device, personal digital assistant, manufacturing tool, any device with a set of one or more processors, etc.). For example, a machine-readable medium includes, but is not limited to, recordable/non-recordable media (e.g., Read-Only Memory (ROM), Random Access Memory (RAM), magnetic disk storage media, optical storage media, a flash memory device, etc.). In addition, a machine-readable medium may include propagated signals such as electrical, optical, acoustical or other forms of propagated signals (e.g., carrier waves, infrared signals, digital signals, etc.).

Various operations of embodiments of the present invention are described herein. These operations may be implemented by a machine using a processor, an Application Specific Integrated Circuit (ASIC), a Field Programmable Gate Array (FPGA), or the like. In one embodiment, one or more of the operations described may constitute instructions stored on a machine-readable medium, that when executed by a machine will cause the machine to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of illustrated embodiments of the invention, including what is described in the Abstract, is not intended to be exhaustive or to limit the embodiments to the precise forms disclosed. While specific embodiments of, and examples for, the invention are described herein for illustrative purposes, various equivalent modifications are possible, as those skilled in the relevant art will recognize. These modifications can be made to embodiments of the invention in light of the above detailed description. The terms used in the following claims should not be construed to limit the invention to the specific embodiments disclosed in the specification.

Rather, the following claims are to be construed in accordance with established doctrines of claim interpretation.

What is claimed is:

1. A computer implemented method, comprising:
graphically displaying, by a processor, a register map that indicates locations of system variables in a memory of a processing device for an embedded application and indicates whether the system variables are read-only or readable-and-writeable;
providing a user interface element for a user to arrange an order of the system variables in the register map; and
receiving a user input that selects one of the system variables and a directional indicator to move the selected system variable in the register map.

2. The method of claim 1, further comprising:
providing a communication interface to the processing device to allow access to values of the system variables in the order indicated by the register map.

3. The method of claim 1, wherein graphically displaying the register map further comprises:
displaying the system variables having the same read attribute and the same write attribute in a list box.

4. The method of claim 1, wherein displaying the system variables further comprises:
displaying readable-and-writable system variables in a first list box and read-only system variables in a second list box.

5. The method of claim 3, further comprising:
maintaining a schema that includes a size, an offset, and an ordinal for each of the system variables.

6. The method of claim 1, further comprising:
providing a promote button to move a selected system variable above a current position in the register map; and
providing a demote button to move the selected system variable below a current position in the register map.

7. A design tool comprising:
a processor;
a register map manager, executable by the processor, to allocate a memory of a processing device to system variables of an embedded application; and
a graphical user interface (GUI) application, executable by the processor and coupled to the register map manager, the GUI application configured to render a register map that indicates locations of the system variables in a memory of the processing device and indicates whether the system variables are read-only or readable-and-writeable, the GUI application further configured to allow a user to arrange an order of the system variables in the register map, and wherein the GUI further comprises a directional indicator configured to allow movement of a selected system variable in the register map.

8. The design tool of claim 7, further comprising:
a communication interface to the processing device to allow access to values of the system variables in the order indicated by the register map.

9. The design tool of claim 7, further comprising:
a register map file that includes a size, an offset, and an ordinal for each of the system variables.

10. The design tool of claim 7, wherein the GUI further comprises:
at least two list boxes, each list box configured to display the system variables that have the same read attribute and the same write attribute.

11. The design tool of claim 7, wherein the directional indicator to move the selected system variable above a current position in the register map and a demote button to move the selected system variable below the current position in the register map.

12. An article of manufacture comprising:
a non-transitory machine-readable medium including a plurality of instructions which when executed by a processor, cause the processor to perform a method comprising:
graphically displaying, by the processor, a register map that indicates locations of system variables in a memory of a processing device for an embedded application and indicates whether the system variables are read-only or readable-and-writeable;
providing a user interface element for a user to arrange an order of the system variables in the register map;
receiving a user input that selects one of the system variables and a directional indicator to move the selected system variable in the register map.

13. The article of manufacture of claim 12, wherein the method further comprises:
providing a communication interface to the processing device to allow access to values of the system variables in the order indicated by the register map.

14. The article of manufacture of claim 12, wherein the method of graphically displaying the register map further comprises:
displaying the system variables having the same read attribute and the same write attribute in a list box.

15. The article of manufacture of claim 12, wherein the method of displaying the system variables further comprises:
displaying readable-and-writable system variables in a first list box and read-only system variables in a second list box.

16. The article of manufacture of claim 14, wherein the method further comprises:
maintaining a schema that includes a size, an offset, and an ordinal for each of the system variables.

17. The article of manufacture of claim 14, wherein the method further comprises: providing a promote button to move a selected system variable above a current position in the register map; and providing a demote button to move the selected system variable below a current position in the register map.

* * * * *